United States Patent
Nicol

(10) Patent No.: US 10,073,773 B2
(45) Date of Patent: Sep. 11, 2018

(54) INSTRUCTION PAGING IN RECONFIGURABLE FABRIC

(71) Applicant: Wave Computing, Inc., Campbell, CA (US)

(72) Inventor: Christopher John Nicol, Campbell, CA (US)

(73) Assignee: Wave Computing, Inc., Campbell, CA (US)

( * ) Notice: Subject to any disclaimer, the term of this patent is extended or adjusted under 35 U.S.C. 154(b) by 211 days.

(21) Appl. No.: 15/048,983

(22) Filed: Feb. 19, 2016

(65) Prior Publication Data
US 2016/0246544 A1    Aug. 25, 2016

Related U.S. Application Data

(60) Provisional application No. 62/119,110, filed on Feb. 21, 2015.

(51) Int. Cl.
*G06F 12/00* (2006.01)
*G06F 12/0802* (2016.01)
*G06F 12/0868* (2016.01)

(52) U.S. Cl.
CPC ...... *G06F 12/0802* (2013.01); *G06F 12/0868* (2013.01); *G06F 2212/60* (2013.01)

(58) Field of Classification Search
None
See application file for complete search history.

(56) References Cited

U.S. PATENT DOCUMENTS

| | | | |
|---|---|---|---|
| 6,134,605 A | 10/2000 | Hudson et al. | |
| 6,363,470 B1 | 3/2002 | Laurenti et al. | |
| 8,314,636 B2 | 11/2012 | Hutton et al. | |
| 8,341,469 B2 | 12/2012 | Miyama et al. | |
| 2007/0101107 A1* | 5/2007 | Isobe | G06F 15/7867 712/226 |
| 2007/0133399 A1 | 6/2007 | Gangwal | |

(Continued)

FOREIGN PATENT DOCUMENTS

| | | |
|---|---|---|
| JP | 2005165961 A | 12/2003 |
| WO | WO2009131569 A1 | 10/2009 |

OTHER PUBLICATIONS

International Search Report dated Feb. 6, 2015 for PCT/US2014/063591.

*Primary Examiner* — Baboucarr Faal
(74) *Attorney, Agent, or Firm* — Adams Intellex, PLC

(57) ABSTRACT

Circular buffers containing instructions that enable the execution of operations on logical elements are described where data in the circular buffers is swapped to storage. Data stored in circular buffers is paged in and out to a second level memory. State information for each logical element is also saved and restored using paging memory. Logical elements such as processing elements are provided instructions via circular buffers. The instructions enable a group of processing elements to perform operations implementing a desired functionality. That functionality is changed by updating the circular buffers with new instructions that are transferred from paging memory. The previous instructions can be saved off in paging memory before the new instructions are copied over to the circular buffers. This enables the hardware to be rapidly reconfigured amongst multiple functions.

22 Claims, 10 Drawing Sheets

(56) References Cited

U.S. PATENT DOCUMENTS

| | | | |
|---|---|---|---|
| 2008/0263323 A1* | 10/2008 | Mould | G06F 9/3836 712/42 |
| 2009/0089605 A1 | 4/2009 | Westwick et al. | |
| 2010/0013517 A1 | 1/2010 | Manohar et al. | |
| 2010/0281448 A1 | 11/2010 | He | |
| 2011/0199117 A1 | 8/2011 | Hutchings et al. | |
| 2012/0119781 A1 | 5/2012 | Manohar et al. | |
| 2012/0235839 A1 | 9/2012 | Mazumdar et al. | |
| 2012/0319730 A1 | 12/2012 | Fitton et al. | |
| 2013/0009666 A1 | 1/2013 | Hutton et al. | |
| 2013/0009667 A1 | 1/2013 | Calhoun et al. | |
| 2013/0043902 A1 | 2/2013 | Rahim et al. | |
| 2014/0075144 A1 | 3/2014 | Sanders et al. | |

\* cited by examiner

INSTRUCTION PAGING IN RECONFIGURABLE FABRIC

FIELD OF ART

This application relates generally to logic circuitry and more particularly to instruction paging for a reconfigurable fabric.

BACKGROUND

The demand for increased computing power to implement newer electronic designs for a variety of applications such as computing, networking, communications, consumer electronics, and data encryption, to name a few, is continuous and crucial in today's modern computing world. In addition to processing speed, configuration flexibility is a key attribute that is desired in modern computing systems. Multiple core processor designs enable two or more cores to run simultaneously, and the combined throughput of the multiple cores can exceed the processing power of a single-core processor. The multiple core capacity allows electronic devices to increase in capability, in accordance with Moore's Law, without hitting the boundaries that would be encountered if attempting to implement similar processing power using a single core processor.

In some architectures, multiple cores can work together to perform a particular task. In this case, the cores communicate with each other, exchange data, and combine data to produce intermediate and/or final outputs. Each core can have a variety of registers to support program execution and storage of intermediate data. Additionally, registers such as stack pointers, return addresses, and exception data can also be present to enable execution of complex routines and support debugging of computer programs running on the multiple cores. Further, arithmetic units can provide mathematical functionality, such as addition, subtraction, multiplication, and division.

Reconfigurability is an important attribute in many processing applications. Reconfigurable devices have proven extremely efficient for certain types of processing tasks. The key to the cost and performance advantages of reconfigurable devices in certain roles is that conventional processors are often limited by instruction bandwidth and execution restrictions. Reconfigurable logic enables program parallelism, allowing for multiple simultaneous computation operations for the same program. Often, the high-density properties of reconfigurable devices come at the expense of the high-diversity property that is inherent in microprocessors. Microprocessors have evolved to a highly optimized configuration that can provide cost/performance advantages over reconfigurable arrays for certain tasks with high functional diversity. However, there are many tasks for which a conventional microprocessor may not be the best design choice. Other conventional computing techniques involve the use of application specific integrated circuits (ASICs), circuits designed from the ground up with a specific application or implementation in mind, to achieve high performance at the cost of extremely inflexible hardware design.

The emergence of reconfigurable computing has created a capability for flexibility and performance of computer systems. Reconfigurable computing combines the high speed of application specific integrated circuits with the flexibility of programmable processors. Reconfigurable processors have further increased the possibility for improvements in processing power and system redundancy. Multiple core reconfigurable processors are continuing to play an important role in the development of new systems, in many disciplines.

SUMMARY

Disclosed embodiments provide for instruction paging for processing. Multiple logical elements, such as processing elements, can be configured into groups. Each processing element is fed instructions by a circular buffer. The instructions enable the group of processing elements to perform operations to implement a desired functionality. When changing the functionality is desired, the circular buffers are updated with new instructions that are transferred from paging memory. The previous instructions can be saved off in paging memory before the new instructions are copied over to the circular buffers. The saving off of previous instructions allows previous functionality to be quickly restored when desired, enabling the hardware to be quickly reconfigured amongst multiple functions and providing increased flexibility.

A processor-implemented method for computation is disclosed comprising: paging data stored in a plurality of circular buffers where the paging comprises: copying data from a first storage memory into the plurality of circular buffers where: the plurality of circular buffers is coupled to logical elements where the plurality of circular buffers controls the logical elements; the data provides instructions for the logical elements; and as the circular buffers rotate, instructions change that are delivered to the logical elements. The paging can include copying the data stored in the plurality of circular buffers into a second storage memory. The paging can occur while other circular buffers continue to rotate. In embodiments, an apparatus for computation comprises: a plurality of circular buffers where the plurality of circular buffers contains instructions for logical elements, coupled to the plurality of circular buffers, and where the plurality of circular buffers contains a first copy of instructions; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers. A first copy of instructions can be swappable to a swapping memory.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
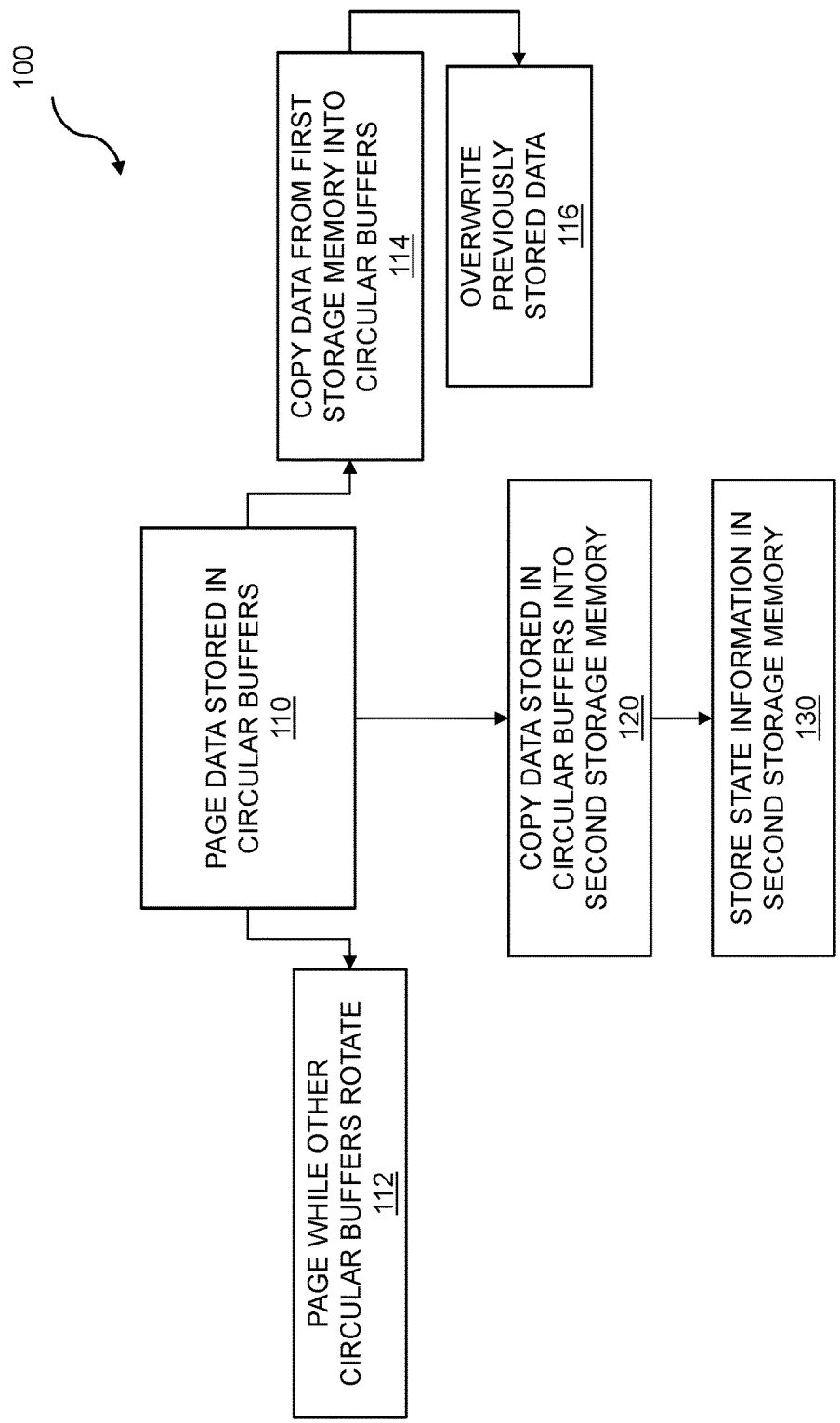
FIG. 1 is a flow diagram for instruction paging.

The staggering pace of change in electronic circuit design techniques and system development continues to drive improvements in hardware designs and associated capabilities. The improvement derives from a wide range of design criteria including system scale, parts availability, time to design, and cost. Design techniques such as those based on microprocessors and/or other semiconductor chips are readily available. These same parts may provide far more capabilities than are required for certain simple applications. But other tasks continuously demand faster and more complex semiconductor implementations. Some custom designs can be tailored to a specific application and can provide the exact capabilities required by that application. Such custom designs are implemented at high cost and cannot be later changed to add new features, fix bugs, or improve performance without extensive and costly redesign. In an attempt to reduce the cost of custom designs, the semiconductor chips can be based on design libraries of circuits, modules, cores, and so on.

Application specific integrated circuits (ASICs) can be designed and built from circuits, modules, and cores. The digital systems that are based on ASICs can be powerful and efficient in certain applications (e.g. their original designs), but can be costly to build and be fixed in functionality. That is, the functionality of the ASICs can be limited solely to their original designs. Another custom circuit design technique can be based on Field Programmable Gate Arrays (FPGAs). FPGAs are based on a common circuit designs (e.g. a NAND structure, ROM, registers, etc.) that can be tailored or "customized" by a customer after manufacture of the chip. The FPGAs can be more versatile than ASICs in that they can be adapted to new tasks after circuit fabrication. At the same time, the FPGAs can be costly and yet be slower than the ASICs that perform the same function. In addition, the FPGAs can be time consuming to reconfigure.

A new technique for reconfigurable circuits employs circular buffers containing instructions that direct computation. Digital computation can be performed by circuits that are configured based on such instructions. A first set of instructions can be provided to the circuits and can be used to control the operations of the circuits, communications between and among multiple circuits, etc. To change the digital computation that can be performed by the circuits, a second set of instructions can be provided to the circuits. The first set of instructions can be grouped and the second set of instructions can be grouped to form one or more pages of instructions. A page can be loaded into a circular buffer which can be used to control a set of operations. The instructions on a page in a circular buffer can continue to be executed until a different page is loaded into the circular buffer. Loading a different page into a given circular buffer in effect changes or reprograms the circuit upon which the instructions in the circular buffer operate. The result of loading different pages into the circular buffer reprograms the digital computational circuit "on the fly" thereby permitting the circuit to be reconfigured as and when needed.

A given computational circuit can include multiple circular buffers and multiple circuits or logical elements. The circuits can include computational elements, communications paths, storage, and other circuit elements. Each circular buffer can be loaded with a page of instructions which configures the digital circuit operated upon by the instructions in the circular buffer. When and if a digital circuit is required to be reconfigured, a different page of instructions can be loaded into the circular buffer and can overwrite the previous page of instructions that was in the circular buffer. A given circular buffer and the circuit element which the circular buffer controls can operate independently from other circular buffers and their concomitant circuit elements. The circular buffers and circuit elements can operate in an asynchronous manner. That is, the circular buffers and circuit elements can be self-clocked, self-timed, etc., and require no additional clock signal. Further, swapping out one page of instructions for another page of instructions does not require retiming the circuit elements. The circular buffers and circuit elements can operate as hum circuits, where a hum circuit is an asynchronous circuit which operates at its own resonant or "hum" frequency.

Disclosed herein are processor-implemented techniques for computation. Digital computation increasingly influences our daily lives. Digital computations enable many life activities, whether playing games, searching for bargains on the latest fashions, researching medical studies, operating equipment and vehicles, communicating with others, or tracking the latest stories on political office holders and office seekers. The digital computation underlies all of these and other activities by supporting artificial intelligence, enabling search operations, controlling monitoring and life support functions, implementing communications protocols, etc. Embodiments disclosed herein provide for paging of instructions for processors. The paging provides for fast reconfiguration of hardware and allows the hardware, which may contain multiple logical elements, to be quickly reconfigured for different tasks. Multiple logical elements (storage, processing, switching) working in a coordinated manner can provide increased computational throughput and can result in benefits superior to that of customized hardware (e.g. ASICs) performance and typical programmable hardware (e.g. FPGAs) flexibility.

FIG. 1 is a flow diagram for paging of instructions. The flow 100 includes paging data stored in a plurality of circular buffers 110. The paging operations can include copying data to/from the plurality of circular buffers into one or more regions of memory. In embodiments, the memory includes, but is not limited to, SRAM and/or DRAM. The paging comprises copying data from a first storage memory into the plurality of circular buffers 114. The copying overwrites previously stored data 116 in the circular buffers. The data from the first storage memory can include instruction information. The instructions can include, but are not limited to, logical AND, OR, NOR, and XOR instructions. Furthermore, other instructions such as mathematical operations, ADD, DIV, SUB, MULT, and various shifting and jump instructions can also be included. The data from the first storage memory can include state information. The state information can include, but is not limited to, program counter values, stack pointer values, and values of other registers used for storage of intermediate results.

In embodiments, the plurality of circular buffers is coupled to logical elements where the plurality of circular buffers controls the logical elements. The logical elements can comprise one or more of switching elements, processing elements, or storage elements. Thus, the circular buffers contain data that causes the logical elements to perform operations. The data provides instructions for the logical elements. As the circular buffers rotate, the instructions that are delivered to the logical elements change. The circular buffers rotate, either by moving within a predetermined memory region, or by moving a program counter to reference a new data location within a circular buffer, where the program counter indicates which piece of data (instruction) is fed to a given logical element (e.g. processor) at any instance in time. Multiple sets of circular buffers and corresponding logical elements can be present. As the circular buffers rotate, the instructions fed to the logical elements change. The instructions that change and that are delivered to the logical elements can provide for the execution of a first sequence of operations by the logical elements.

In embodiments, data stored in the circular buffers is copied into a second storage memory 120. Optionally, state information can also be stored in the second storage memory 130. The state information can include, but is not limited to, program counter values, stack pointer values, and values of other registers used for the storage of intermediate results.

At an appropriate time, a second set of instructions can be copied from the first storage memory to the circular buffers. Thus, the data from the first storage memory provides a second set of instructions to the logical elements. In turn, the second set of instructions can provide a second sequence of operations to be executed by the logical elements. The first sequence of operations and the second sequence of operations can differ. In this way, the plurality of logical elements can be reprogrammed for new functionality based on the copying of the second set of instructions into the circular buffers and the subsequent rotating of the circular buffers while they contain the second set of instructions.

In embodiments, multiple sets of circular buffers are present. The paging can occur while circular buffers other than the plurality of circular buffers continue to rotate 112. Thus, the other circular buffers can continue to rotate and feed instructions to logical elements while the set of circular buffers undergoing a paging operation is stabilized to prepare for restoring, reprogramming, or copying of the circular buffer information, which can include instructions and/or state information. In embodiments, the paging could be referred to as hot swapping of instructions into a massively parallel processing computer.

Figure 2:
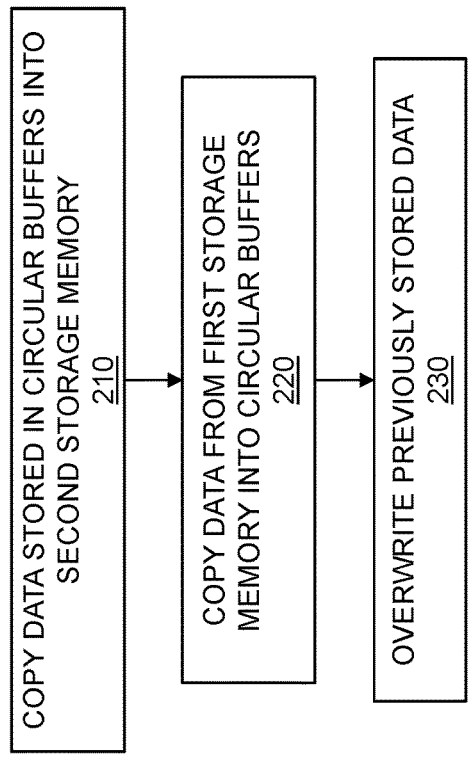
FIG. 2 is a flow diagram for data copying.

FIG. 2 is a flow diagram 200 for data copying. As before, it should be noted that the present disclosure includes embodiments for paging memory, where the paging includes instruction paging. The paging can further comprise copying data stored in a plurality of circular buffers into a second storage memory 210. The flow 200 can further comprise storing state information in the second storage memory. The state information can include, but is not limited to, program counter values, stack pointer values, and values of other registers used for storage of intermediate results. The copying of the data stored in the plurality of circular buffers into a second storage memory can occur before the copying of the data from a first storage memory into the plurality of circular buffers 220. In such a manner, the contents and/or state information are preserved so that they can be restored at a later time. Thus, the logical elements can be programmed for different functionality, and can operate across different functionalities in a time-shared manner by switching out sets of instructions and/or state information using multiple pages simultaneously. Additionally, after the data originally stored in the circular buffers has been copied into the second storage memory, the copying of the data from the first storage memory into the plurality of circular buffers can cause data previously stored in the plurality of circular buffers to be overwritten 230.

In embodiments, the first storage memory comprises the second storage memory. That is, the first storage memory and the second storage memory can be implemented using a single region of memory implemented as a dual port memory. In some embodiments, the first storage memory and the second storage memory are substantially similar, but in other embodiments, the sizes of the first storage memory and second storage memory differ. The size of the storage memory can depend on a variety of factors, including, but not limited to, the number and size of the circular buffers, the instruction size, and the size of the state information. In some embodiments, paging can be utilized to provide a larger overall processing function by swapping out some operations for other operations.

Figure 3:
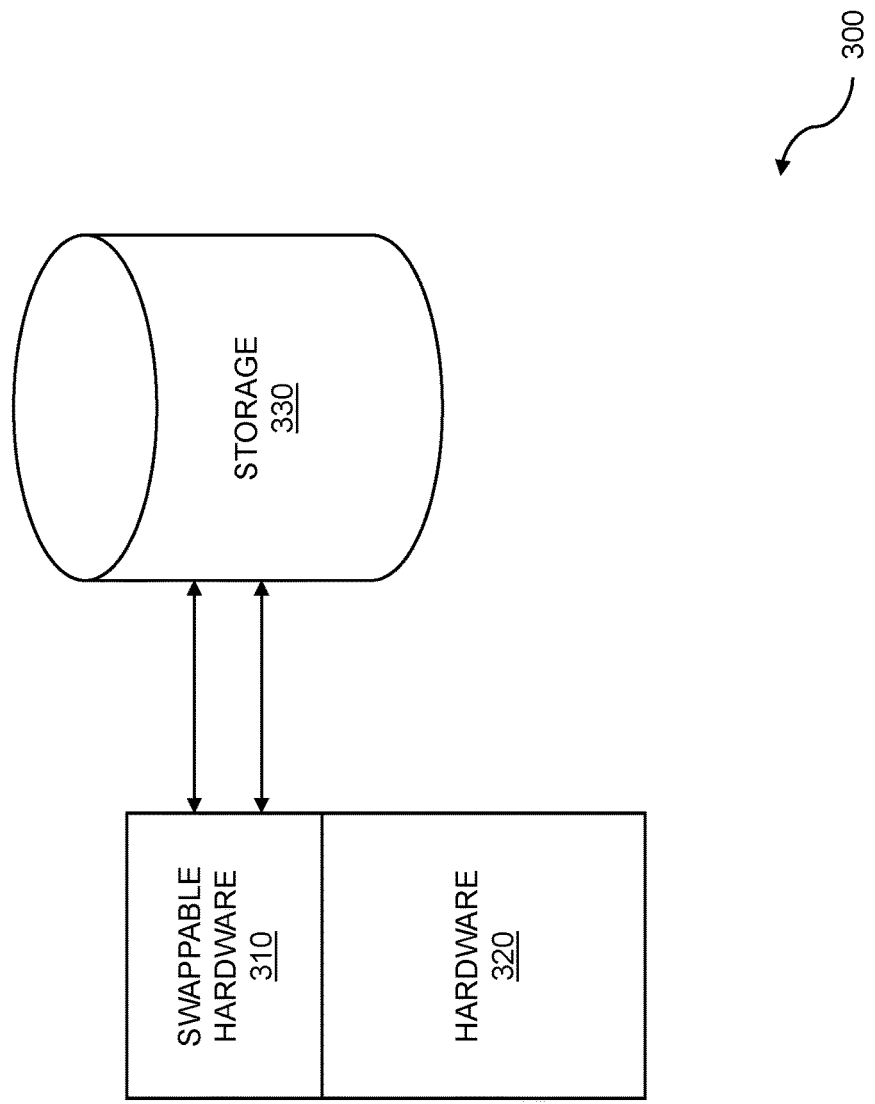
FIG. 3 is an apparatus illustrating instruction paging.

FIG. 3 is an apparatus 300 illustrating instruction paging. Swappable reconfigurable hardware 310 comprises one or more logical elements that are configured and disposed to receive data from a corresponding circular buffer. The logical elements and circular buffers can be arranged in groups. One group can have its corresponding circular buffers updated with new data from the storage 330 while other groups continue to rotate, providing instructions to their corresponding logical elements. The storage 330 can include static RAM (SRAM), dynamic RAM (DRAM), or another suitable memory technology. The swapping memory can comprise the storage memory. The storage memory can include state information for the plurality of circular buffers. The swapping memory can further contain state information that is copied from circuitry associated with the plurality of circular buffers.

Other hardware 320 besides the swappable reconfigurable hardware 310 can include one or more processors and/or controllers that implement paging control functionality. The hardware 320 can comprise elements that are configured and disposed to control the mode of operation of the circular buffers and/or the logical elements. The circular buffers can operate in a normal mode, where the circular buffers rotate and provide instructions to logical elements to implement a desired functionality. The circular buffers can also be placed in a stabilized mode. The stabilized mode can be an offline mode, in which the circular buffers stop rotating, and/or the logical elements remain in a paused or sleep state. Once the circular buffers are in a stabilized mode, the contents of the circular buffers can be safely changed by copying new instructions into the circular buffers from the storage 330 into the circular buffers corresponding to the swappable hardware 310. The non-swappable hardware 320 can initiate transfer of the existing instructions from the circular buffers corresponding to the swappable hardware to the storage 330 before loading new instructions into the circular buffers. The non-swappable hardware 320 can control how frequently the paging operations occur, and on which group(s) the paging operations occur.

For example, consider a case where the swappable hardware 310 comprises three groups of circular buffers and logical elements, referred to as groups A, B, and C. The hardware 320 can operate in a round-robin manner, where at first the circular buffers of group A are placed in a stabilized mode, while elements B and C continue to execute as normal and the logical elements of group B and C continue to receive instructions from their respective circular buffers. Then, the circular buffers of group A are updated from the storage 330, and the hardware 320 places group A into normal mode, thus beginning logical element execution of the new instructions. The process is then repeated on group B, on group C, and then performed on group A again, etc. In some embodiments, more than one group are simultaneously placed into stabilized mode for paging. For example, in some embodiments, the hardware 320 implements a paging control functionality that updates the instructions of groups A and B at the same time, while allowing group C to continue in normal mode. In some embodiments, the hardware 320 operates in an event-driven mode, where the paging occurs based on an event. The event can be an interrupt based on an internal or external condition. For example, an interrupt based on an input/output (TO) signal can trigger a paging operation. In other embodiments, the paging is triggered upon encountering a program exception. In such a case, if a group of logical elements encounters a program exception (e.g. invalid instruction, divide by zero, etc.), then the circular buffers can be loaded with a new set of instructions from the storage 330 as part of a recovery procedure.

Figure 4:
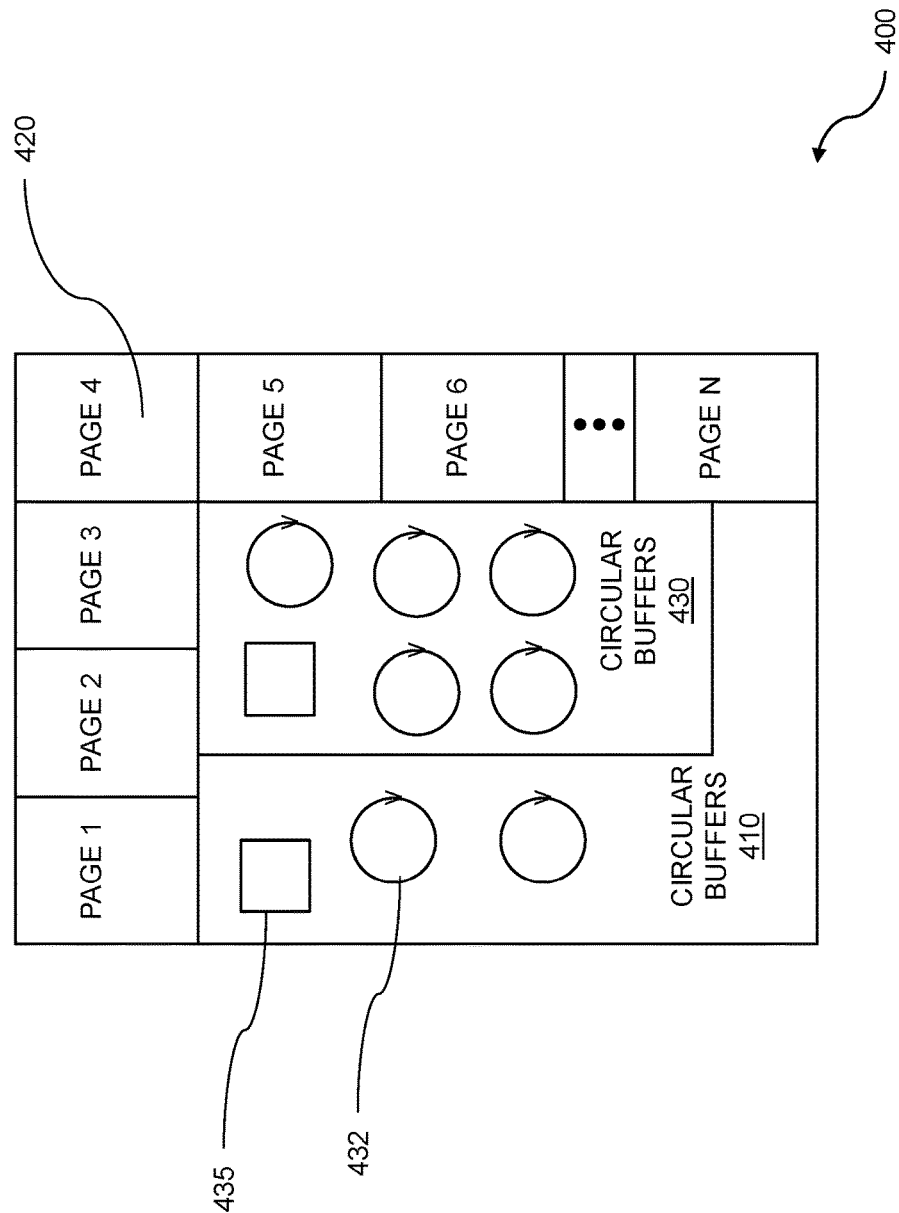
FIG. 4 is an apparatus showing page memory and circular buffers.

FIG. 4 is an apparatus showing page memory and circular buffers. The apparatus 400 comprises a swapping memory that can include a plurality of pages 420. Each page is configured to store instructions from a group of circular buffers such as the circular buffer 432. As shown in FIG. 4, a first group of circular buffers 430 is present and comprises a plurality of circular buffers. A second group of circular buffers 410 is also present. In some embodiments, the first group of circular buffers 430 and the second group of circular buffers 410 comprise the same number of circular buffers, while in other embodiments, the first group of circular buffers 430 and the second group of circular buffers 410 comprise a differing number of circular buffers. As illustrated in FIG. 4, the first group of circular buffers 430 comprises five circular buffers while the second group of circular buffers 410 comprises two circular buffers. In embodiments, more than two groups of circular buffers are present. Each group of circular buffers interfaces to a set of switches and connections 435, which are configured and disposed to steer data to and from the circular buffers 432 and the paging memory 420.

The apparatus 400 can further comprise a further storage for a third copy of instructions for the plurality of circular buffers, where the further storage is coupled to the plurality of circular buffers, as well as a further set of switches and connections for transferring contents of the further storage to the plurality of circular buffers. Thus, a first copy of instructions might reside in page 1, a second copy of instructions might reside in page 2, and a third copy of instructions might reside in page 3, etc. Multiple pages are present across various embodiments, with any number of pages possible. The first copy (as well as any of the other copies) of the instructions can be swappable to a swapping memory, as well as swappable to the further storage memory. The further storage memory can include a different page of memory. The first copy of instructions can be copied to a swapping memory before the third copy of instructions is moved into the plurality of circular buffers. In an operation such as this, the previous functionality of the logical elements can be restored at a later time by a paging control functionality.

Circular buffers other than the first plurality of circular buffers 430, such as the second plurality of circular buffers 410, can continue to rotate while the set of switches and connections transfers contents of the storage memory (from one or more pages) to the first plurality of circular buffers 430. As the circular buffers rotate, instructions change that are delivered to the logical elements. The instructions that change and that are delivered to the logical elements can provide for the execution of a first sequence of operations by the logical elements.

The data from the storage memory can provide a second set of instructions to the logical elements. The second set of instructions can provide a second sequence of operations by the logical elements. The first sequence of operations and the second sequence of operations can differ. Thus, the collection of logical elements can be dynamically reconfigured to perform different functionality in a time-sharing manner. That is, the plurality of circular buffers can dynamically change operations of the logical elements based on circular buffer rotation.

For example, the logical elements can be configured for a first application (e.g. data decryption) and then, by paging in a new set of instructions, the logical elements can be configured for a second application (e.g. transmission of data). In cases where instructions and/or state information is saved prior to paging in the new set of instructions, the first application can be resumed after a predetermined time interval or upon occurrence of an event.

The apparatus 400 can include an apparatus for computation comprising: a plurality of circular buffers, where the plurality of circular buffers contains instructions for logical elements, coupled to the plurality of circular buffers, and where the plurality of circular buffers contains a first copy of instructions; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

Figure 5:
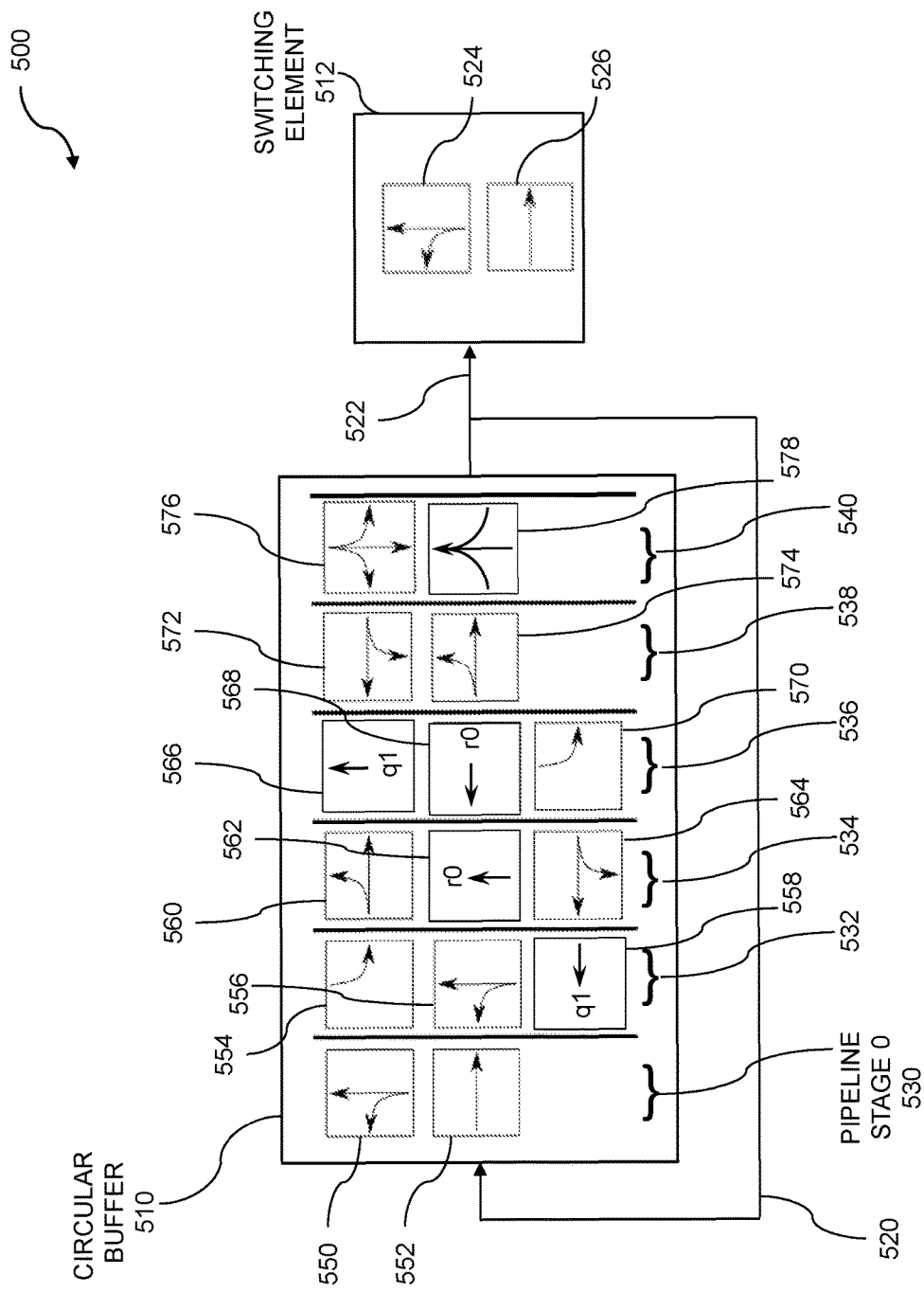
FIG. 5 is an example circular buffer with a switching element.

FIG. 5 is an example circular buffer and a corresponding switching element. The block diagram 500 describes an apparatus for data manipulation. The circular buffer 510 contains a plurality of pipeline stages. Each pipeline stage contains one or more instructions, up to a maximum instruction depth. In the embodiment shown in FIG. 5, the circular buffer 510 is a 6×3 circular buffer, meaning that the buffer implements a six stage pipeline with an instruction depth of up to three instructions per stage (column). Hence, the circular buffer 510 can include one, two, or three switch instruction entries per column. In some embodiments, the plurality of switch instructions per cycle comprises two or three switch instructions per cycle. However, in certain embodiments, the circular buffer 510 supports only a single switch instruction in a given cycle. In the diagram 500 shown, the step Pipeline Stage 0 530 has an instruction depth of two instructions 550 and 552. Though the remaining pipeline stages 1-5 are not textually labeled in the FIG. 500, the stages are indicated by callout numbers 532, 534, 536, 538 and 540, respectively. Pipeline Stage 1 532 has an instruction depth of three instructions, 554, 556, and 558. Pipeline Stage 2 534 has an instruction depth of three instructions, 560, 562, and 564. Pipeline Stage 3 536 also has an instruction depth of three instructions, 566, 568, and 570. Pipeline Stage 4 538 has an instruction depth of two instructions, 572 and 574. Pipeline Stage 5 540 also has an instruction depth of two instructions, 576 and 578. In embodiments, the circular buffer 510 includes 64 columns.

During operation, the circular buffer 510 rotates through configuration instructions. The circular buffer 510 can dynamically change operation of the logical elements based on the rotation of the circular buffer. The circular buffer 510 can comprise a plurality of switch instructions per cycle for the configurable connections.

The instruction 552 is an example of a switch instruction. In embodiments, each cluster has four inputs and four outputs, each designated within the cluster's nomenclature as "north," "east," "south," and "west," respectively. For example, the instruction 552 in the diagram 500 is a west-to-east transfer instruction. The instruction 552 directs the cluster to take data on its west input and send out the data on its east output. Another example of data routing, the instruction 550, is a fan-out instruction. The instruction 550 instructs the cluster to take data on its south input and send out the data on both its north output and its west output. The arrows within each instruction box indicate the source and destination of the data. Continuing with more examples, the instruction 578 is an example of a fan-in instruction. The instruction 578 directs the cluster to take data from its west, south, and east inputs and to send out the data on its north output. Therefore, the configurable connections can be considered to be time multiplexed.

In embodiments, the clusters implement multiple storage elements in the form of registers. In the diagram 500 shown, the instruction 562 is a local storage instruction. The instruction 562 directs the cluster to take data from its south input and store it in a register (r0). The instruction 568 is a retrieval instruction. The instruction 568 instructs the cluster to take data from the register (r0) and output it on the cluster's west output. Some embodiments utilize four general purpose registers, referred to as registers r0, r1, r2, and r3. The registers are, in embodiments, storage elements which store data while the configurable connections are busy with other data. In embodiments, the storage elements are 32-bit registers. In other embodiments, the storage elements are 64-bit registers. Other register widths are possible.

In embodiments, the clusters implement multiple processing elements in the form of processor cores, referred to as cores q0, q1, q2, and q3. Four cores can be used, though any number of cores are possible. The instruction 558 is a processing instruction. The instruction 558 directs the cluster to take data from the cluster's east input and send the data to a processor q1 for processing. The processor or processors can perform logic operations on the data, including, but not limited to, a shift operation, a logical AND operation, a logical OR operation, a logical NOR operation, a logical XOR operation, an addition, a subtraction, a multiplication, and a division. Thus, the configurable connections can comprise one or more of a fan-in, a fan-out, and a local storage.

In the example 500 shown, the circular buffer 510 rotates instructions in each pipeline stage into switching element 512 via a forward data path 522, and also back to the first stage, Pipeline Stage 0 530, via a feedback data path 520. Instructions can include switching instructions, storage instructions, and processing instructions, among others. The feedback data path 520 can allow instructions within the switching element 512 to be transferred back to the circular buffer. Hence, the instructions 524 and 526 in the switching element 512 can also be transferred back to the Pipeline Stage 0 as the instructions 550 and 552. In addition to the instructions depicted in FIG. 5, a no-op instruction or a sleep instruction can also be inserted into a pipeline stage. In embodiments, a no-op instruction causes execution not to be performed for a given cycle. In effect, the introduction of a no-op instruction can cause a column within the circular buffer 510 to be skipped in a cycle. In contrast, not skipping an operation indicates that a valid instruction is being pointed to in the circular buffer. A sleep state can be accomplished by not applying a clock to a circuit, not performing processing within a processor, removing a power supply voltage or bringing a power supply to ground, storing information into a non-volatile memory for future use and then removing power applied to the memory, or by similar techniques. A sleep instruction is an instruction that causes no execution to be performed until an explicitly specified, predetermined event occurs which causes the logical element to exit the sleep state. The predetermined event can be the arrival or availability of valid data. The data can be determined to be valid using null convention logic (NCL). In embodiments, only valid data is allowed to flow through the switching elements, and Xs (invalid data points) are not propagated by instructions.

In some embodiments, the sleep state is exited based on an instruction applied to a switching fabric. The sleep state can only, in some embodiments, be exited by a stimulus external to the logical element and not based on the programming of the logical element. The external stimulus can include an input signal, which in turn can cause a wake-up or an interrupt service request to execute on one or more of the logical elements. An example of such a wake-up request can be seen in the instruction 558, assuming that the processor q1 was previously in a sleep state. In embodiments, when the instruction 558 takes valid data from the east input of the cluster and applies that data to the processor q1, the processor q1 wakes up and operates on the received data. In the event that the data is not valid, the processor q1 can remain in a sleep state. At a later time, data can be retrieved from the q1 processor, e.g. by using an instruction such as the instruction 566. In the case of the instruction 566, data from the processor q1 is moved to the north output of the processor. In some embodiments, if Xs have been placed into the processor q1, such as during the instruction 558, then Xs would be retrieved from the processor q1 during the execution of the instruction 566 and in turn applied to the north output of the cluster containing the instruction 566.

A collision occurs if multiple instructions route data to a particular port in a given pipeline stage. For example, if instructions 552 and 554 are in the same pipeline stage, they will both send data to the east output at the same time, thus causing a collision since neither instruction is part of a time-multiplexed fan-in instruction (such as the instruction 578). To avoid potential collisions, certain embodiments use preprocessing, such as by a compiler, to arrange the instructions in such a way that there are no collisions when the instructions are loaded into the circular buffer. Thus, the circular buffer 510 can be statically scheduled in order to prevent data collisions. In embodiments, when the preprocessor detects a data collision, the scheduler changes the order of the instructions to prevent the collision. Alternatively or additionally, the preprocessor can insert further instructions such as storage instructions (e.g. the instruction 562), sleep instructions, or no-op instructions, to prevent the collision. Alternatively or additionally, the preprocessor can replace multiple instructions with a single fan-in instruction. For example, if a first instruction sends data from the south input to the north output and a second instruction sends data from the west input to the north output in the same pipeline stage, the first and second instruction can be replaced with a fan-in instruction that routes the data from both of those inputs to the north output in a deterministic way to avoid a data collision. In this case, the machine can guarantee that valid data is only applied on one of the inputs for the fan-in instruction.

Figure 6:
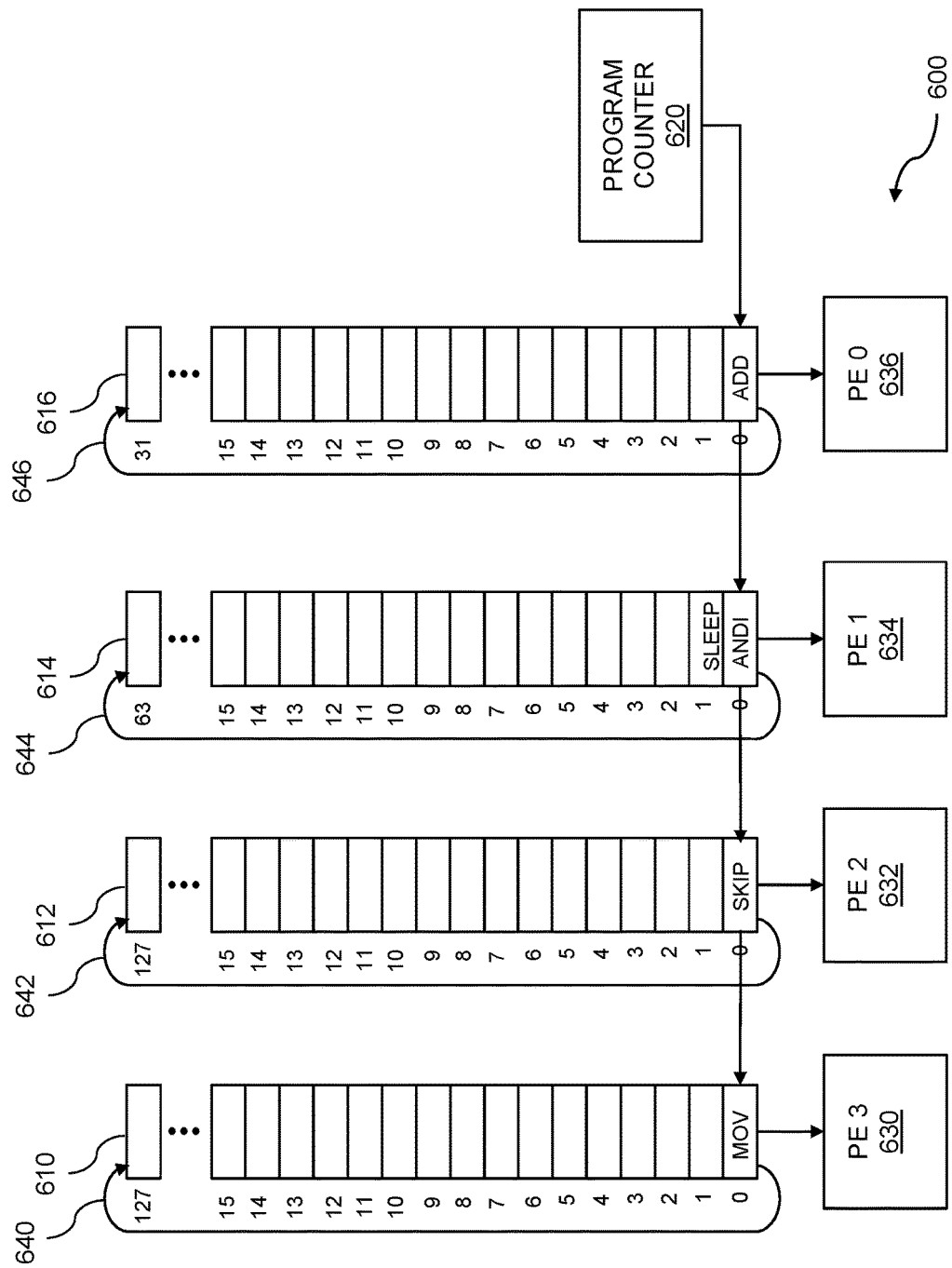
FIG. 6 shows an example circular buffer and processing elements.

FIG. 6 shows example circular buffers and processing elements. This figure shows a diagram 600 indicating example instruction execution for processing elements. A circular buffer 610 feeds a processing element 630. A second circular buffer 612 feeds another processing element 632. A third circular buffer 614 feeds another processing element 634. A fourth circular buffer 616 feeds another processing element 636. The four processing elements 630, 632, 634, and 636 can represent a quad of processing elements. In embodiments, the processing elements 630, 632, 634, and 636 are controlled by instructions received from the circular buffers 610, 612, 614, and 616. The circular buffers can be implemented using feedback paths 640, 642, 644, and 646, respectively. In embodiments, the circular buffer can control the passing of data to a quad of processing elements through switching elements, where each of the quad of processing elements is controlled by four other circular buffers (as shown in the circular buffers 610, 612, 614, and 616) and where data is passed back through the switching elements from the quad of processing elements where the switching elements are again controlled by the main circular buffer. In embodiments, a program counter 620 is configured to point to the current instruction within a circular buffer. In embodiments with a configured program counter, the contents of the circular buffer are not shifted or copied to new locations on each instruction cycle. Rather, the program counter 620 is incremented in each cycle to point to a new location in the circular buffer. The circular buffers 610, 612, 614, and 616 can contain instructions for the processing elements. The instructions can include, but are not limited to, move instructions, skip instructions, logical AND instructions, logical AND-Invert (e.g. ANDI) instructions, logical OR instructions, mathematical ADD instructions, shift instructions, sleep instructions, and so on. A sleep instruction can be usefully employed in numerous situations. The sleep state can be entered by an instruction within one of the processing elements. One or more of the processing elements can be in a sleep state at any given time. In some embodiments, a "skip" can be performed on an instruction and the instruction in the circular buffer can be ignored and the corresponding operation not performed.

The plurality of circular buffers can have differing lengths. That is, the plurality of circular buffers can comprise circular buffers of differing sizes. In embodiments, the circular buffers 610 and 612 have a length of 128 instructions, the circular buffer 614 has a length of 64 instructions, and the circular buffer 616 has a length of 32 instructions, but other circular buffer lengths are also possible, and in some embodiments, all buffers have the same length. The plurality of circular buffers that have differing lengths can resynchronize with a zeroth pipeline stage for each of the plurality of circular buffers. The circular buffers of differing sizes can restart at a same time step. In other embodiments, the plurality of circular buffers include a first circular buffer repeating at one frequency and a second circular buffer repeating at a second frequency. In this situation, the first circular buffer is of one length. When the first circular buffer finishes through a loop, it can restart operation at the beginning, even though the second, longer circular buffer has not completed its operations. When the second circular buffer reaches completion of its loop of operations, the second circular buffer can restart operations from its beginning.

Figure 7:
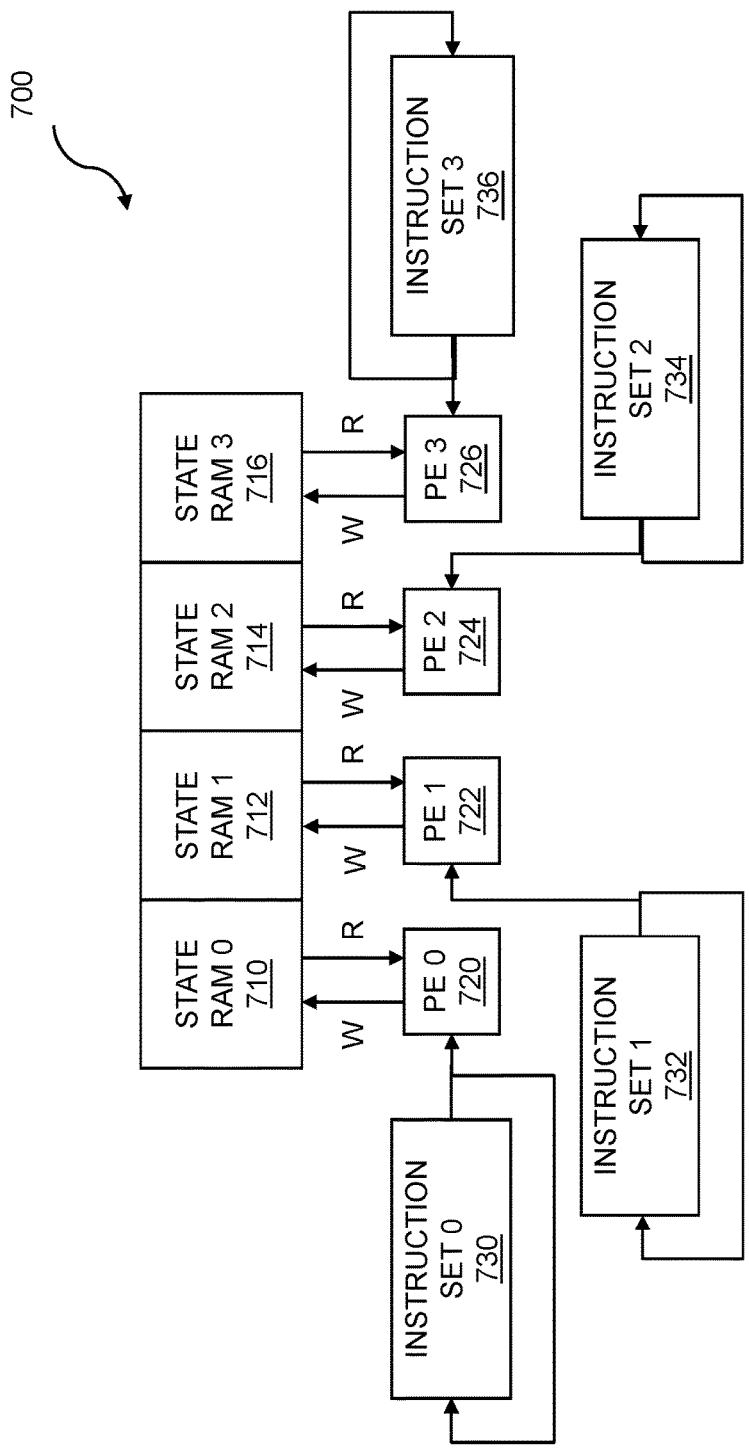
FIG. 7 shows example memory and processing elements.

FIG. 7 shows an example of memory and processing elements. In the example 700, a plurality of instruction sets are stored in circular buffers. An instruction set 0 730 is configured and disposed to provide instructions to a processing element PE 0 720. An instruction set 1 732 is configured and disposed to provide instructions to a processing element PE 1 722. An instruction set 2 734 is configured and disposed to provide instructions to a processing element PE 2 724. An instruction set 3 736 is configured and disposed to provide instructions to a processing element PE 3 726. Each processing element can have a corresponding state RAM. The state RAM is a memory that holds state information about each processing element. Such state information can include, but is not limited to, program counter values, stack pointer values, return addresses, and other register values. As shown in the example 700, each processing element has its own state RAM. The processing element PE 0 720 is configured and disposed to read and write state information to/from a state RAM 0 710. The processing element PE 1 722 is configured and disposed to read and write state information to/from a state RAM 1 712. The processing element PE 2 724 is configured and disposed to read and write state information to/from a state RAM 2 714. The processing element PE 3 726 is configured and disposed to read and write state information to/from a state RAM 3 716. Note that while four processing elements are illustrated in FIG. 7, other embodiments will have more or fewer processing elements.

The example 700 can include stable configuration logic to maintain a stable configuration while rotation occurs. Stabilization logic can be used to effectively disengage one or more processing elements while a swapping/paging operation takes place. The disengaging prevents nondeterministic behavior as new instructions are loaded into the circular buffers. Other circular buffers than the plurality of circular buffers can continue to rotate while a third copy of instructions is transferred to the plurality of circular buffers. In some embodiments, the circular buffers are reprogrammed without stopping or pausing execution of processing elements. In such an embodiment, as the program counter advances from the first instruction location of the circular buffer, new instructions from the paging memory are written into the locations of the circular buffer that have already executed for a given cycle. When the program counter gets to the last location of the circular buffer, it then restarts from the first location with a new set of instructions that have been copied in from the paging/swappable memory.

Figure 8:
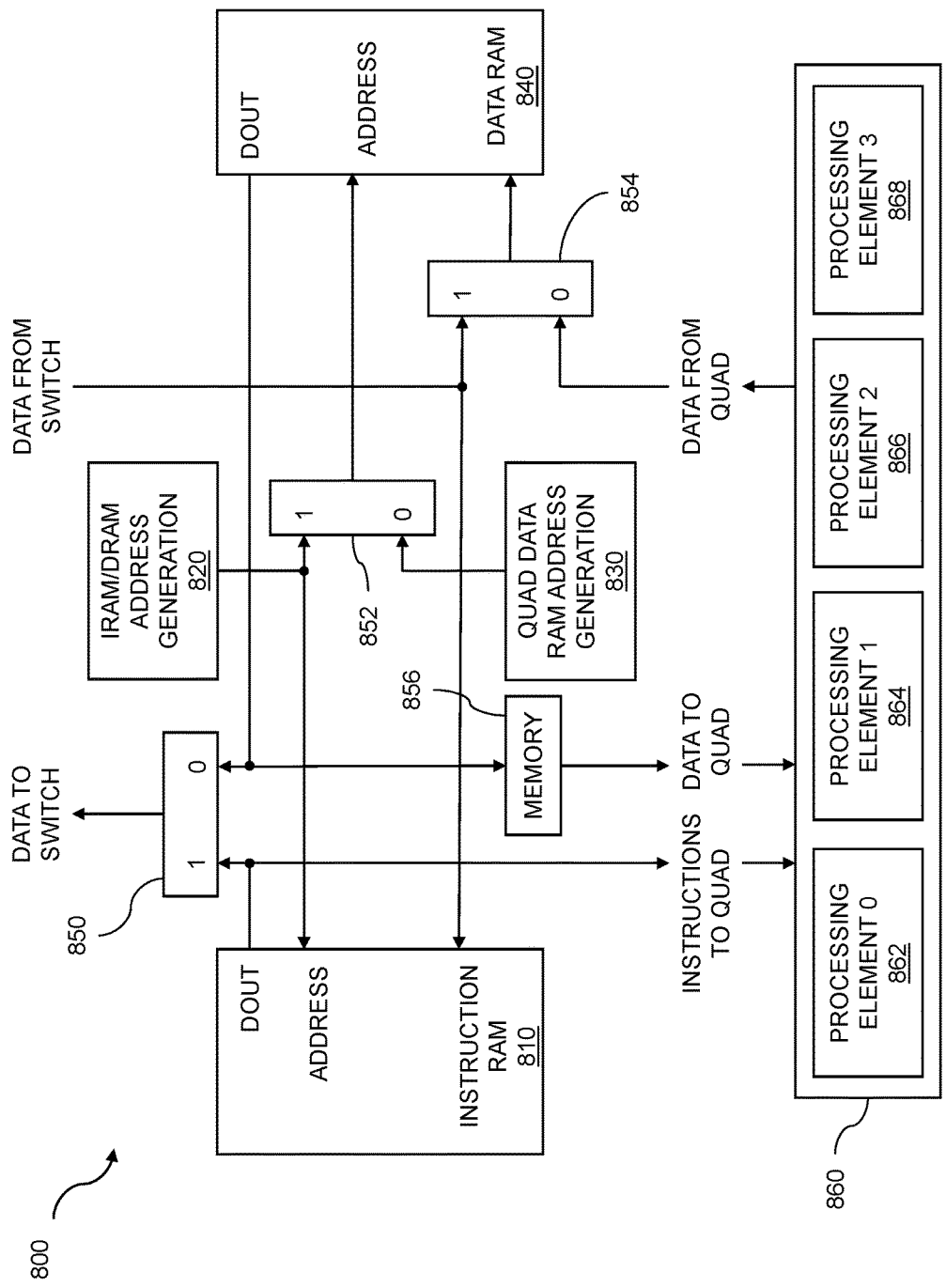
FIG. 8 is an architecture showing access sharing of processing elements.

FIG. 8 is an architecture 800 showing access sharing of processing elements. A quad 860 comprises four processing elements: a processing element 0 862, a processing element 1 864, a processing element 2 866, and a processing element 3 868. To implement paging operations, instructions and data (including state information) is transferred to and from the processing elements of the quad 860. An instruction RAM 810 contains instructions that, when executed by processing elements, perform logical operations. A data RAM 840 contains data (which can include state data) that is used by the processing elements during logical operations, and during the resumption of execution of previously loaded instruction sets. The data from the data RAM 840 can be routed through a switch (mux) 850 to additional switches that can be part of a fabric. The data from the data RAM 840 can also be routed to a memory 856 and then in turn provided to the processing elements 862, 864, 866 and 868 of the quad 860. In embodiments, the memory 856 is used to delay data to the quad 860 by one or more cycles.

During a paging operation, in some cases, before loading a new instruction set into circular buffers, the current instruction set can be saved off to the paging memory and can further include saving data, such as state data that is associated with the current execution of the processing elements. In such an operation, data from the quad 860 can be routed through a switch (mux) 854 to the data RAM 840.

A quad data RAM address generation 830 contains logic that facilitates stepping through the state data stored in the data RAM 840. Similarly, an IRAM/DRAM address generation 820 contains logic that facilitates stepping through the data stored in the instruction RAM 810. The stored data is used when loading up the instruction RAM 810 and the data RAM 840, and also input to the switch 850. The data is then routed to additional switches that are part of the switches and connections going to and from the paging memory and the circular buffers and registers. The quad data RAM address generation 830 and the IRAM/DRAM address generation 820 are fed through a switch 852 to the data RAM 840. The data RAM 840 can be updated based on instructions that are executed from the instruction RAM 810. In embodiments, there is arbitration between the processing elements 862, 864, 866 and 868.

Figure 9:
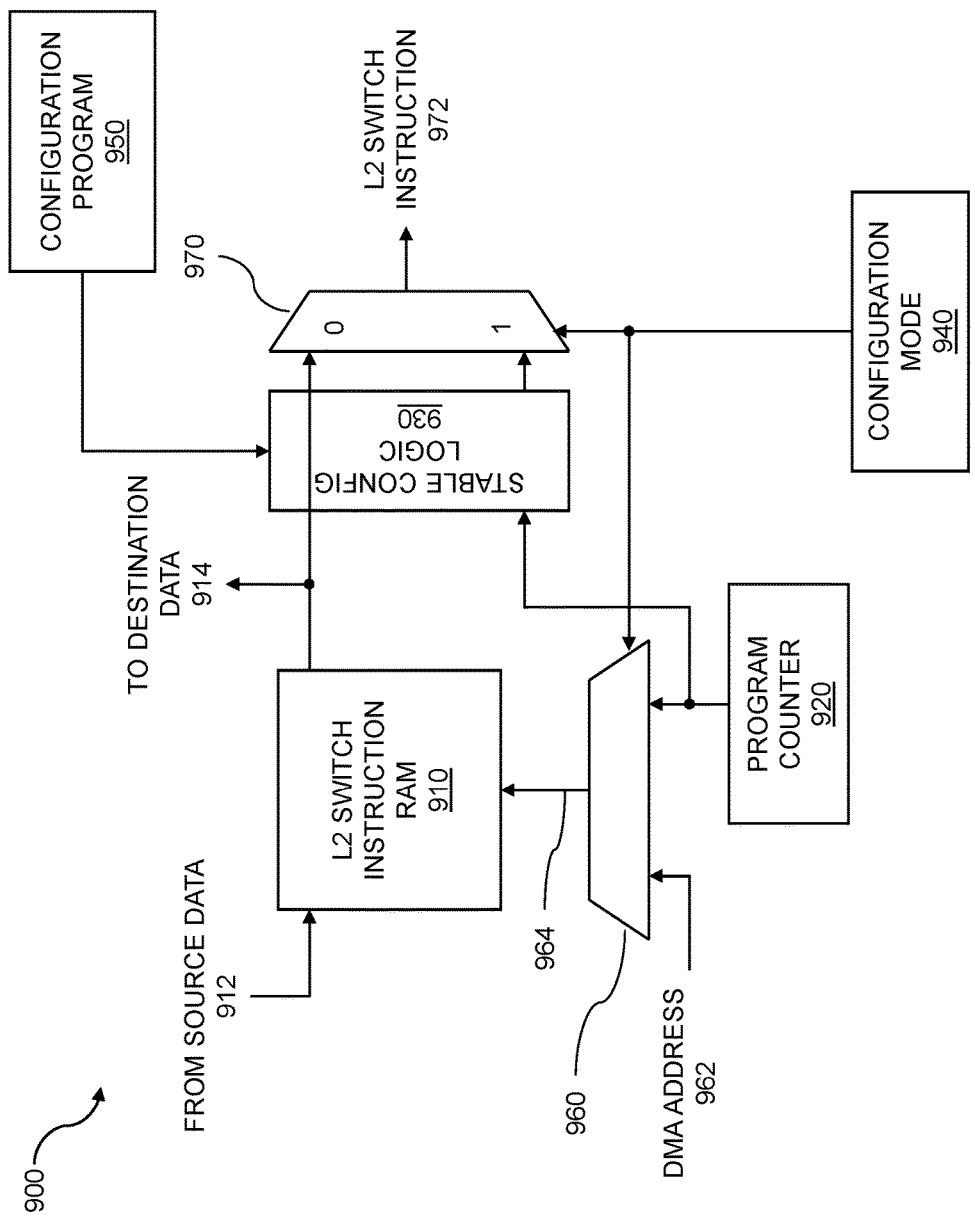
FIG. 9 shows an example switching architecture with stability logic.

FIG. 9 shows an example switching architecture 900 with stability logic. Stability logic can be used to safely perform paging/swapping operations on circular buffers while avoiding nondeterministic behavior. In some cases, the processing elements can be paused or taken offline to perform the paging operation. A configuration program 950 contains memory which can be used to load a level 2 switch instruction RAM 910 with instructions. The instructions can be in the form of operations on a circular buffer similar to those described earlier. In embodiments, the configuration program contains two instructions, one for the write path to destination data 914, and one for the read path from source data 912. The stable configuration logic 930 can be coupled to one or more processing elements to put the processing elements into stabilized mode. The processing elements can be in a paused state or offline mode, disconnected from a program counter 920. The disconnection serves to prevent execution of the instructions in circular buffers as the circular buffer contents (instructions) are being updated. Once the circular buffers are updated, the stable configuration logic can return the processing elements to the normal mode. The configuration mode 940 is a signal that controls the level two switch instruction 972, which is output to a switch and then forwarded on to logical elements. Thus, the configuration mode can select normal operation (through a path 0 of a switch 970), or the stabilization mode (through a path 1 of the switch 970). The configuration mode 940 also controls another switch 960 such that, when in stabilizing mode, a DMA address 962 is selected for input 964 into the level 2 switch instruction RAM 910, and when in normal operation, the program counter 920 is selected for input 964 into the level 2 switch instruction RAM 910.

Figure 10:
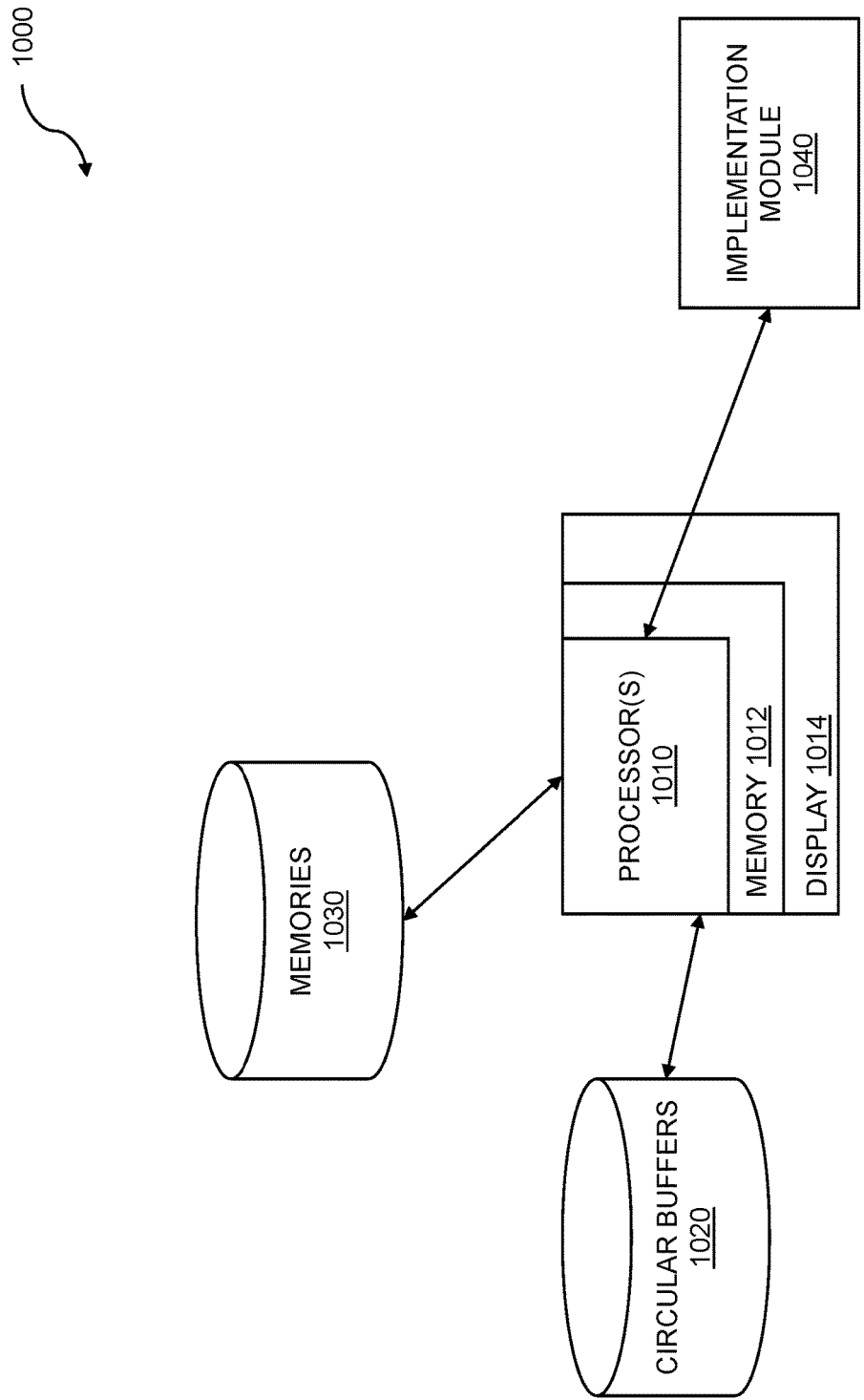
FIG. 10 is a system diagram for implementing instruction paging logic.

FIG. 10 is a system diagram for implementing instruction paging logic. The system 1000 can include a computer-implemented method of logic implementation comprising: designing a processing architecture made up of a plurality of circular buffers where the plurality of circular buffers contains instructions for logical elements, coupled to the plurality of circular buffers, and where the plurality of circular buffers contains a first copy of instructions; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

The system 1000 can include a computer program product embodied in a non-transitory computer readable medium for implementation of a logical calculation apparatus comprising: code for designing a processing architecture, including a plurality of circular buffers where the plurality of circular buffers contains instructions for logical elements, coupled to the plurality of circular buffers, and where the plurality of circular buffers contains a first copy of instructions; a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers.

The system 1000 can include one or more processors 1010 and a memory 1012. The memory 1012 can be used for storing instructions, for storing circuit designs, for storing logic designs, for system support, and the like. The memory can contain data in a data format used for the exchange of layout data of integrated circuits (e.g. information stored in a GDSII, OASIS, or any other suitable format for storing such design structures). The one or more processors 1010 can read in information regarding the circular buffers 1020 and memories 1030, and implement various instruction paging logic designs using an implementation module 1040. The circular buffers 1020 can be represented in the form of digital data stored on a storage medium such as a hard disk. The digital data can be in the form of a library or a database. The library or database can comprise a plurality of standard designs. Similarly, the memories 1030 can be represented in the form of digital data stored on a storage medium such as a hard disk. The circular buffer digital data can also be in the form of a library or database. In at least one embodiment, the implementation module 1040 functions are accomplished by the one or more processors 1010.

In embodiments, one or more of the circular buffers 1020, memories 1030, and the implementation module 1040 are interconnected via the Internet. Cloud computing can be used to design the memories and circular buffers, as well as the interconnecting logic between them. The implementation module can further include instructions for implementation of the stabilization circuitry used to stabilize logical elements prior to updating the circular buffer contents. Information about the various designs can be shown on a display 1014 which can be attached to the one or more processors 1010. The display 1014 can be any electronic display, including but not limited to, a computer display, a laptop screen, a net-book screen, a tablet screen, a cell phone display, a mobile device display, a remote with a display, a television, a projector, and the like.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A processor-implemented method for computation comprising:
   paging data stored in a plurality of circular buffers where the paging comprises:
   copying data from a first storage memory into the plurality of circular buffers where:
   the plurality of circular buffers is coupled to logical elements where the plurality of circular buffers controls the logical elements, wherein the plurality of circular buffers have differing lengths, and wherein the plurality of circular buffers that have differing lengths resynchronize with a zeroth pipeline stage for each of the plurality of circular buffers;
   the data provides instructions for the logical elements; and
   as the circular buffers rotate, instructions change that are delivered to the logical elements.

2. The method of claim 1 wherein the paging further comprises copying the data stored in the plurality of circular buffers into a second storage memory.

3. The method of claim 2 further comprising storing state information in the second storage memory.

4. The method of claim 1 wherein the instructions that change, that are delivered to the logical elements, provide a first sequence of operations by the logical elements.

5. The method of claim 4 wherein the data from the first storage memory provides a second set of instructions to the logical elements.

6. The method of claim 1 wherein the plurality of circular buffers have differing lengths.

7. The method of claim 6 wherein the plurality of circular buffers include a first circular buffer repeating at one frequency and a second circular buffer repeating at a second frequency.

8. An apparatus for computation comprising:
   a plurality of circular buffers where the plurality of circular buffers contains instructions for logical elements, coupled to the plurality of circular buffers, where the plurality of circular buffers contains a first copy of instructions, wherein the plurality of circular buffers have differing lengths, and wherein the plurality of circular buffers that have differing lengths resynchronize with a zeroth pipeline stage for each of the plurality of circular buffers;

a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers, wherein the contents comprise instructions for the logical elements, and wherein as the plurality of circular buffers rotates, instructions that are delivered to the logical elements change.

9. The apparatus of claim 8 wherein the first copy of instructions is swappable to a swapping memory.

10. The apparatus of claim 9 wherein the swapping memory further contains state information that is copied from circuitry associated with the plurality of circular buffers.

11. The apparatus of claim 8 further comprising a further storage memory for a third copy of instructions for the plurality of circular buffers where the further storage memory is coupled to the plurality of circular buffers; and a further set of switches and connections for transferring contents of the further storage memory to the plurality of circular buffers.

12. The apparatus of claim 11 wherein the first copy of instructions is copied to a swapping memory before the third copy of instructions is moved into the plurality of circular buffers.

13. The apparatus of claim 8 wherein other circular buffers, than the plurality of circular buffers, continue to rotate while the set of switches and connections transfers contents of the storage memory to the plurality of circular buffers.

14. The apparatus of claim 8 wherein other circular buffers, than the plurality of circular buffers, continue to rotate while a third copy of instructions are transferred to the plurality of circular buffers.

15. The apparatus of claim 14 further comprising stable configuration logic to maintain a stable configuration while rotation occurs.

16. The apparatus of claim 8 wherein, as the circular buffers rotate, instructions change that are delivered to the logical elements.

17. The apparatus of claim 16 wherein the instructions that change, that are delivered to the logical elements, provide a first sequence of operations by the logical elements.

18. The apparatus of claim 17 wherein the data from the storage memory provides a second set of instructions to the logical elements.

19. The apparatus of claim 18 wherein the second set of instructions provide a second sequence of operations by the logical elements.

20. The apparatus of claim 19 wherein the first sequence of operations and the second sequence of operations differ.

21. The apparatus of claim 8 wherein the plurality of circular buffers dynamically change operations of the logical elements based on circular buffer rotation.

22. A computer program product embodied in a non-transitory computer readable medium for implementation of a logical calculation apparatus comprising:

code for designing a processing architecture including:

a plurality of circular buffers where the plurality of circular buffers contains instructions for logical elements, coupled to the plurality of circular buffers, where the plurality of circular buffers contains a first copy of instructions, wherein the plurality of circular buffers have differing lengths, and wherein the plurality of circular buffers that have differing lengths resynchronize with a zeroth pipeline stage for each of the plurality of circular buffers;

a storage memory containing a second copy of instructions for the plurality of circular buffers where the storage memory is coupled to the plurality of circular buffers; and a set of switches and connections, coupled to the plurality of circular buffers, for transferring contents of the storage memory to the plurality of circular buffers, wherein the contents comprise instructions for the logical elements, and wherein as the plurality of circular buffers rotates, instructions that are delivered to the logical elements change.

* * * * *